No. 772,380. PATENTED OCT. 18, 1904.
F. SCHLEIFENBAUM & E. SCHÜRER.
METAL SHEATHED ELECTRIC CABLE.
APPLICATION FILED SEPT. 21, 1903.

NO MODEL. 2 SHEETS—SHEET 1.

WITNESSES:
Georg Müller
Karl Schmidt

INVENTORS:
Friedrich Schleifenbaum
Eugen Schürer

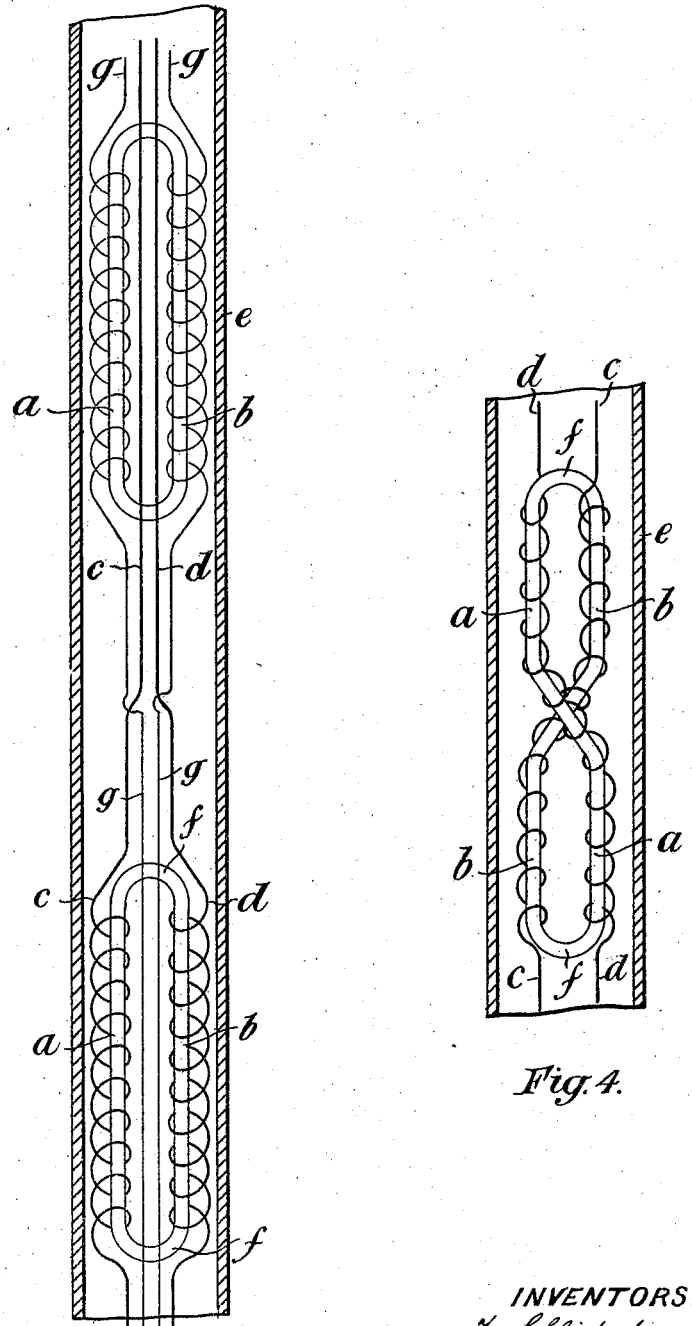

No. 772,380. Patented October 18, 1904.

UNITED STATES PATENT OFFICE.

FRIEDRICH SCHLEIFENBAUM AND EUGEN SCHÜRER, OF MÜLHEIM-ON-THE-RHINE, GERMANY, ASSIGNORS TO FELTEN & GUILLEAUME CARLSWERK ACTIEN-GESELLSCHAFT, OF MÜLHEIM-ON-THE-RHINE, GERMANY.

METAL-SHEATHED ELECTRIC CABLE.

SPECIFICATION forming part of Letters Patent No. 772,380, dated October 18, 1904.

Application filed September 21, 1903. Serial No. 174,099. (No model.)

*To all whom it may concern:*

Be it known that we, FRIEDRICH SCHLEIFENBAUM and EUGEN SCHÜRER, subjects of the German Emperor, residing at Mülheim-on-the-Rhine, in the German Empire, have invented new and useful Improvements in Metal-Sheathed Electric Cables, of which the following is a specification.

This invention relates more particularly to metal-sheathed electric cables, and is designed to increase the self-induction and thereby diminish the electrostatic capacity of such cables. With this object the cable is provided internally with a self-induction device constructed and arranged in such a manner that the diameter of the cable is neither enlarged nor its flexibility impaired.

Figure 2:
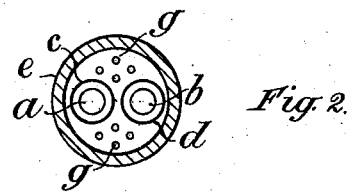
Figure 1:
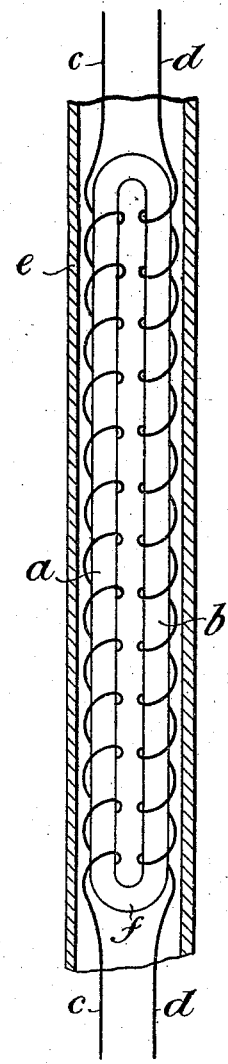

In the accompanying drawings, Figure 1 is a longitudinal section of a portion of a cable provided with our self-induction device, and Fig. 2 a cross-section of the same. Fig. 3 illustrates a cable provided with more than one self-induction device, while Fig. 4 shows the device twisted.

According to one mode of carrying out the invention two magnetizable cores $a$ $b$, consisting of iron wires laid together or united in any other manner, are arranged parallel within the metallic sheathing $e$, the insulated wires $c$ $d$, constituting the telephonic or other electric conductors, being respectively laid up spirally about the two parallel cores $a$ $b$.

In order to minimize the radiation into the armoring and to enhance the self-induction, (by reducing the magnetic resistance,) the two cores $a$ and $b$, forming the duplex core $f$, are preferably closed upon one another at their respective ends, so that an endless loop of the same material is produced, forming a closed circuit for the lines of force. Without departing from the principle of the invention these two parts $a$ and $b$ may, however, be divided, although this would entail certain disadvantages. The two conducting-wires $c$ and $d$ are laid up about each of the two parts $a$ $b$ of the duplex magnetic core $f$ with equal or approximately equal windings, and they are wound in the same direction.

The currents flowing through the conducting-wires $c$ $d$ in opposite directions produce in each of the parts $a$ and $b$ of the duplex core a flow of lines of force which are equal to each other in power, but opposite in direction, so that in the lead sheathing $e$ or other closed metallic armoring, which may be regarded as forming a closed transformer-winding, no electromotive force is created by induction.

If the cable consists of more than one loop, as shown in Fig. 3, the remaining conducting-wires $g$ are laid in the spaces between the two windings of the wires $c$ and $d$, so that they are carried past them, and the duplex bobbins of each loop are placed one after the other at appropriate distances apart. In order to enhance the flexibility of the cable, the one part, $a$, of the duplex core or bobbin may be twisted about its fellow part, $b$, as shown in Fig. 4, without prejudicially affecting the working.

What we claim as our invention, and desire to secure by Letters Patent, is—

1. The combination with a metal-sheathed electric cable, of a flexible self-induction duplex bobbin, comprising two symmetrical parallel cores respectively wound with a substantially equal number of windings of the conducting-wires laid up in the same direction, substantially as and for the purpose set forth.

2. The combination with a metal-sheathed electric cable, of a flexible self-induction duplex bobbin, comprising two symmetrical cores respectively wound with a substantially equal number of windings of the conducting-wires laid up in the same direction, the two cores with their windings being twisted together, substantially as and for the purpose set forth.

3. A flexible self-induction duplex bobbin, comprising two symmetrical parallel cores respectively wound with a substantially equal number of windings of the conducting-wires laid up in the same direction, substantially as and for the purpose set forth.

4. A flexible self-induction duplex bobbin, comprising two symmetrical cores respectively wound with a substantially equal number of windings of the conducting-wires laid up in the same direction, the two cores with their windings being twisted together, substantially as and for the purpose set forth.

In testimony whereof we have signed our names to this specification in the presence of two subscribing witnesses.

FRIEDRICH SCHLEIFENBAUM.
EUGEN SCHÜRER.

Witnesses:
G. REMER,
JOH. SCHULZ.